United States Patent [19]

Rummelhoff et al.

[11] Patent Number: 6,155,077
[45] Date of Patent: Dec. 5, 2000

[54] METHOD FOR CONDENSATION OF A GAS

[75] Inventors: Carl Jørgen Rummelhoff; Jørund Bakke, both of Moss, Norway

[73] Assignee: Kvaerner Maritime as, Norway

[21] Appl. No.: 09/180,359

[22] PCT Filed: May 6, 1997

[86] PCT No.: PCT/NO97/00117

§ 371 Date: Jan. 6, 1999

§ 102(e) Date: Jan. 6, 1999

[87] PCT Pub. No.: WO97/42455

PCT Pub. Date: Nov. 13, 1997

[30] Foreign Application Priority Data

May 6, 1996 [NO] Norway ..................................... 961824

[51] Int. Cl.[7] ..................................................... F25J 1/02
[52] U.S. Cl. ................................................. 62/611; 62/657
[58] Field of Search .............................. 62/611, 623, 657

[56] References Cited

U.S. PATENT DOCUMENTS

| | | | |
|---|---|---|---|
| 4,142,876 | 3/1979 | Zahn et al. ................................. | 62/37 |
| 4,172,711 | 10/1979 | Bailey ......................................... | 62/21 |
| 5,473,900 | 12/1995 | Low ............................................. | 62/9 |
| 5,476,986 | 12/1995 | Jacobsen . | |

FOREIGN PATENT DOCUMENTS

| | | |
|---|---|---|
| 2172388 | 9/1986 | United Kingdom . |
| 2253042 | 8/1992 | United Kingdom . |
| 2289054 | 11/1995 | United Kingdom . |

*Primary Examiner*—William Doerrler
*Assistant Examiner*—Malik N. Drake
*Attorney, Agent, or Firm*—Birch, Stewart, Kolasch & Birch, LLP

[57] ABSTRACT

A method for condensation of a gas with several fractions such as a gas from the tank compartment in an oil tanker during loading. The gas is supplied to a first heat exchanger and cooled therein by a coolant. Condensed and non-condensed gas fractions are supplied separately from the heat exchanger. For further exploitation of the cooled, non-condensed gas fractions, these and an additional gas are passed separately from the tank compartment to a second heat exchanger where the non-condensed fractions cool the gas and cause condensation of its fractions with a condensation temperature which is less than the temperature of the non-condensed gas fractions from the first heat exchanger.

4 Claims, 1 Drawing Sheet

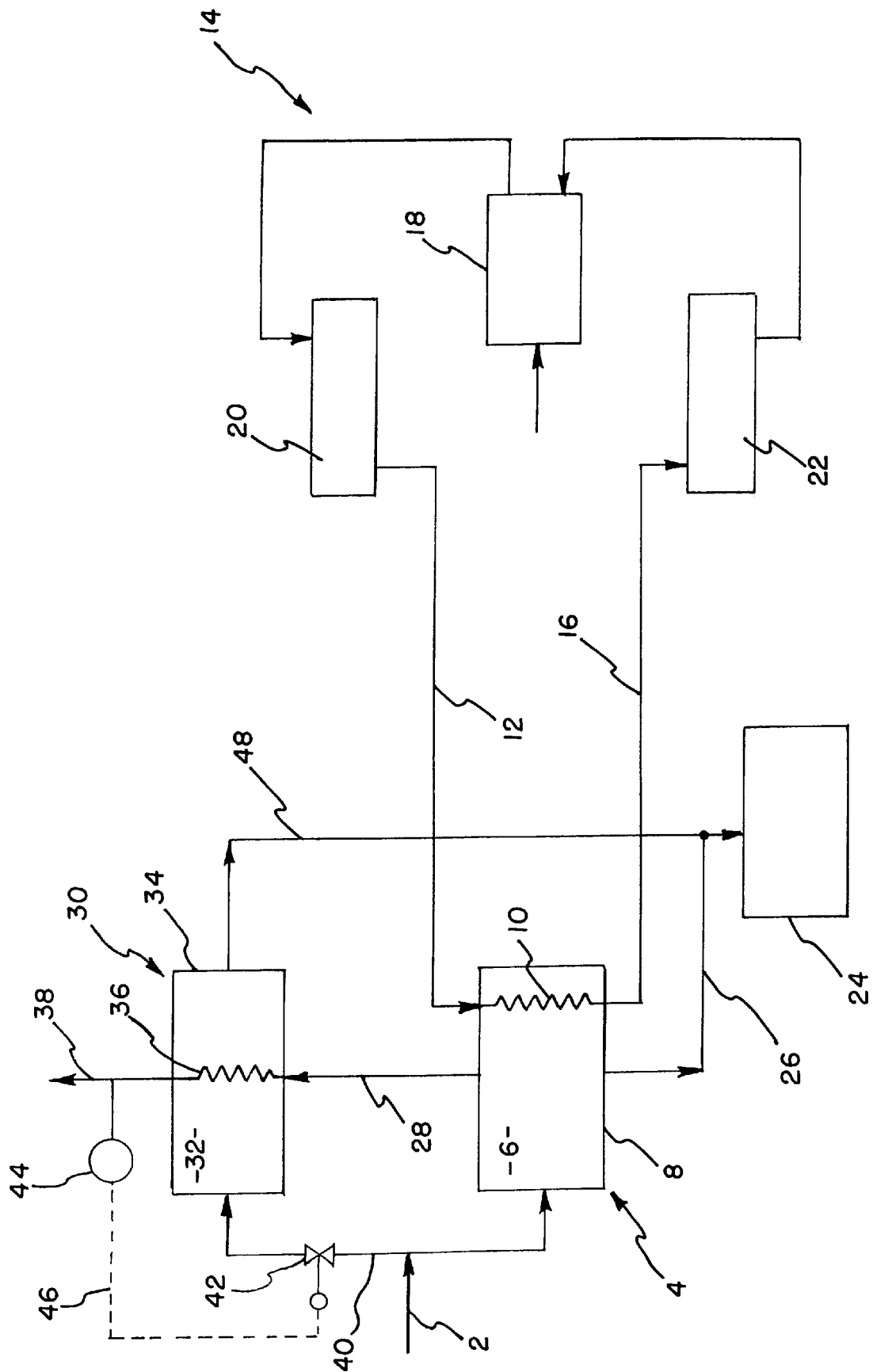

METHOD FOR CONDENSATION OF A GAS

This application is the national phase under 35 U.S.C. §371 of prior PCT International Application No. PCT/NO97/00117 which has an International filing date of May 6, 1997 which designated the United States of America, the entire contents of which are hereby incorporated by reference.

FIELD OF THE INVENTION

The invention concerns a method for condensation of a gas with several fractions.

DESCRIPTION OF THE BACKGROUND ART

It is assumed that such a method is generally known per se, but there is a possibility of employing it in connection with transport of oil by means of tankers, and more specifically during the loading thereof. In the case of such an application, which can be regarded as novel, however, the non-condensed fractions would be released directly into the open air from the first passage of the first heat exchanger. Since refrigerating energy has also been used for cooling of these fractions, the energy which has been employed for cooling these fractions is thereby lost.

Similarly, particularly in the case of the above-mentioned application, in order to provide the refrigerated coolant, a known per se cooling plant can be employed with a capacity which is adapted to the cooling capacity which has to be produced during the condensation. The plant therefore has to be relatively large and thus space consuming and expensive. Since the cooling plant is only used during the oil loading, for economic reasons it is stopped while the ship is underway. The short operating time of the cooling plant in relation to the long period during which it is not in operation is a contributing factor to its unsatisfactory utilization.

SUMMARY OF THE INVENTION

The object of the invention is to provide a method of the type mentioned in the introduction, whereby the above-mentioned drawbacks can be avoided.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawing which is given by way of illustration only, and thus is not limitative of the present invention.

The invention will now be described in more detail with reference to the drawing whose single FIGURE is a schematic block diagram illustrating a device for implementing the method according to the invention.

DETAILED DESCRIPTION OF THE PREFERRED EMBODIMENTS

As illustrated in the figure the device comprises a pipe 2 via which, e.g., a gas containing several fractions, at least some of which have to be condensed, is passed to a first heat exchanger 4. This heat exchanger 4 may comprise in the known manner a first passage 6 which is composed, e.g., of an inner space in a housing 8 of the heat exchanger 4, and a second passage 10, which is composed of a pipe or the like which extends in the inner space.

A coolant is supplied via a supply pipe 12 to the second passage 10 of the heat exchanger 4 from a cooling plant 14 and passed back to the cooling plant 14 via a return pipe 16. The cooling plant 14 comprises a refrigerating machine 18. In the supply pipe 12 there is provided between the refrigerating machine 18 and the first heat exchanger 4 a storage tank 20 for refrigerated coolant, and in the return pipe 16 there is provided a return tank 22 for heated coolant, i.e. coolant which has been used for cooling in the heat exchanger 4.

Gas fractions which have been condensed in the first heat exchanger 4 are passed to a collecting tank 24 from this heat exchanger 4 via a pipe 26.

Gas fractions which have not been condensed in the first heat exchanger 4 are passed via a pipe 28 to a second heat exchanger 30. Like the first heat exchanger 4 this heat exchanger 30 has a first passage 32 which is composed of an inner space in a housing 34 and a second passage 36 which is composed of a pipe or the like which extends in the inner space.

The pipe 28 communicates with an inlet end of the second passage 36 of the second heat exchanger 30, and the outlet end of this passage 36 leads out into, e.g., the open air via a pipe 38.

Gas from the pipe 2 can be supplied to the first passage 32 of the second heat exchanger 30 via a pipe 40. In this pipe there is provided, e.g., an electrically operated shut-off valve 42. The temperature of the fluid which flows in the pipe 38 from the second passage 36 of the second heat exchanger 30 may be established by a temperature sensor 44, which can emit an impulse via an electrical cable 46 to the shut-off valve 42 for operation thereof. If the temperature is less than a predetermined threshold temperature corresponding to the condensation temperature for one of the fractions of the gas, the valve is opened. If the temperature is greater, the valve is closed.

Condensed gas in the second heat exchanger 30 can flow to the collecting tank 24 from the first passage 32 via a pipe 48.

The device works as follows.

As an example, during loading of oil in tanks of oil tankers some of the oil evaporates. If this vapour, hereinafter called gas, is permitted to flow directly out into the open air from the tank, the gas can cause pollution of the air, in addition to which valuable oil is lost.

An attempt is therefore made to condense the gas by means of the method according to the invention. For this purpose the gas is supplied via the pipe 2 to the first passage 6 of the heat exchanger 4, where some fractions of the gas condense and flow to the collecting tank 24. Heat energy from the remaining fractions of the coolant are, however, transferred to the coolant, thus causing it to become heated and these fractions to be cooled.

The release of these fractions into the open air, however, would entail a waste of the energy which has been used in the cooling plant.

The non-condensed fractions from the first passage 6 of the first heat exchanger are therefore supplied to the second passage 36 of the second heat exchanger 30 from which the fractions can flow out into the open air. However, if the temperature of these non-condensed fractions is less than a threshold temperature corresponding to the condensation temperature of at least one of the gas fractions in the pipe 2, the non-condensed fractions will be capable of causing condensation of this fraction. If the temperature thus falls below this threshold temperature, an impulse is emitted by the temperature sensor 44 for opening the shut-off valve 42, whereupon gas can flow to the first passage 32 of the second heat exchanger via the pipe 40.

The fraction or fractions of the gas which are thereby supplied to the second heat exchanger 30 and there condensed are passed to the collecting tank 24 via the pipe 48. Thus the use of the supplied coolant has been optimized.

Since loading of oil only constitutes a small part of the time the ship is in operation, a cooling plant which is only in use during loading will in the first place only be employed for a short period during each voyage. If in addition the cooling plant's refrigerating machine 18 has the same capacity as the capacity which is required during the above-described condensation during the oil loading, i.e. it is capable of removing a thermal quantity per time unit from the coolant corresponding to the thermal quantity which the coolant removes from the gas, in the second place the refrigerating machine 18 only requires to be employed during loading, while during the greater part of the voyage it can be stopped, which is uneconomical.

The cooling plant 14 therefore comprises the storage tank 20 which has a capacity, which is at least great enough to enable it to contain the amount of coolant which is necessary for condensation of the gas during loading. The return tank 22 has a similar capacity. The refrigerating machine 18, however, has a capacity which is small enough to enable it to run continuously during the whole voyage, but which nevertheless is great enough to enable it to have filled the storage tank 20 before loading with at least the quantity of cooling fluid which is consumed during the condensation while loading is taking place.

The refrigerating machine 18 can therefore be very small and the production, operating and maintenance costs thereof can consequently also be small.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for condensation of a gas with several fractions, wherein the gas is supplied to a first passage of a first heat exchanger where the gas is cooled by a refrigerated coolant which is supplied to a second passage of the first heat exchanger from a cooling plant with a refrigerating machine, whereupon condensed and non-condensed gas fractions are supplied separately from the first heat exchanger, the condensed fractions being supplied to a collecting container, the method including the steps of supplying gas to a first passage of a second heat exchanger and the non-condensed fraction from the first heat exchanger to a second passage of the second heat exchanger;

removing non-condensed gas fractions from the second heat exchanger, whereby gas fractions in the first passage with a condensation temperature which is higher than a temperature of the supplied, non-condensed fractions from the first heat exchanger are condensed in the first passage of the second heat exchanger and similarly supplied therefrom to the first collecting container;

measuring the temperature of the non-condensed gas fractions which are removed from the second passage of the second heat exchanger; and permitting gas to flow into the first passage of the second heat exchanger only if the temperature from measuring is less than the condensation temperature of some of the fractions in the gas.

2. The method according to claim 1, wherein the step of removing removes all non-condensed gas fractions from the second heat exchanger.

3. The method according to claim 1, wherein the coolant is supplied to the first heat exchanger from a storage tank for this purpose and passed to a return tank from this heat exchanger, the cooling capacity which is yielded by the coolant in the heat exchanger exceeding cooling capacity of the refrigerating machine.

4. The method according to claim 3, wherein the step of removing removes all non-condensed gas fractions from the second heat exchanger.

* * * * *